US 12,001,963 B2

(12) United States Patent
Subramanian et al.

(10) Patent No.: US 12,001,963 B2
(45) Date of Patent: Jun. 4, 2024

(54) FACILITATING ML ALGORITHM CONTRIBUTION TO USE CASES WHERE DATA IS PROHIBITIVE

(71) Applicant: Sensormatic Electronics, LLC, Boca Raton, FL (US)

(72) Inventors: Gopi Subramanian, Boca Raton, FL (US); Michael C. Stewart, Deerfield Beach, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 261 days.

(21) Appl. No.: 17/207,340

(22) Filed: Mar. 19, 2021

(65) Prior Publication Data

US 2021/0343129 A1 Nov. 4, 2021

Related U.S. Application Data

(60) Provisional application No. 63/018,190, filed on Apr. 30, 2020.

(51) Int. Cl.
*G06N 3/126* (2023.01)
*G06F 18/214* (2023.01)
(Continued)

(52) U.S. Cl.
CPC ........... *G06N 3/126* (2013.01); *G06F 18/214* (2023.01); *G06N 20/00* (2019.01); *G08B 13/2474* (2013.01)

(58) Field of Classification Search
CPC ............ G08B 13/2474; G08B 13/2482; G08B 29/186; G06K 9/6256; G06N 3/126; G06N 20/00
See application file for complete search history.

(56) References Cited

U.S. PATENT DOCUMENTS 10,026,506 B1 * 7/2018 LaBorde ............ G06K 7/10366
2009/0177599 A1 * 7/2009 Bhaskar ................. G06N 3/126
706/13
(Continued)

FOREIGN PATENT DOCUMENTS

CN 110309771 A 10/2019
EP 0724246 A2 * 7/1996 ......... G08B 13/2471
EP 0724246 B1 10/2003

OTHER PUBLICATIONS

Xiadong Cui et al: "Evolutionary Stochastic Gradient Descent for Optimization of Deep Neural Networks", arxiv.org, Cornell University Library, 201 Olin Library Cornell University Ithaca, NY 14853, Oct. 16, 2018.

*Primary Examiner* — Joseph H Feild
*Assistant Examiner* — Rufus C Point
(74) *Attorney, Agent, or Firm* — ArentFox Schiff LLP (57) ABSTRACT

Example aspects include techniques for building a ML model in a use case with prohibitive training data and employing the ML model within the use case. These techniques may include determining training information including a plurality of stray training reads and a plurality of valid training reads, determining modified training information based at least in part on modifying the plurality of valid training reads, and generating a model for distinguishing a valid read from a stray read based on the modified training information and an evolutionary algorithm. In addition, the techniques may include detecting, by a monitoring device, a plurality of tag reads in response to a plurality of interactions between a tag and the monitoring device, and determining, by the monitoring device, a plurality of valid tag reads based on the model and plurality of tag reads.

20 Claims, 3 Drawing Sheets

(51) Int. Cl.
  *G06N 20/00* (2019.01)
  *G08B 13/24* (2006.01)

(56) References Cited

U.S. PATENT DOCUMENTS

| | | | |
|---|---|---|---|
| 2010/0039228 A1* | 2/2010 | Sadr | G01S 5/12 |
| | | | 340/10.1 |
| 2016/0316325 A1* | 10/2016 | Sadr | H04W 4/027 |
| 2016/0338798 A1* | 11/2016 | Vora | A61B 5/0006 |
| 2017/0147722 A1* | 5/2017 | Greenwood | G06N 3/126 |
| 2018/0137316 A1* | 5/2018 | Fischer | G06K 19/071 |
| 2019/0073591 A1* | 3/2019 | Andoni | G06N 3/126 |
| 2019/0302231 A1* | 10/2019 | Kuzbari | G01S 13/75 |
| 2021/0182922 A1* | 6/2021 | Zheng | H04N 23/69 |

\* cited by examiner

FACILITATING ML ALGORITHM CONTRIBUTION TO USE CASES WHERE DATA IS PROHIBITIVE

CROSS-REFERENCE TO RELATED APPLICATION

This application claims priority to U.S. App. No. 63/018,190 filed on Apr. 30, 2020, the disclosure of which is incorporated by reference herein in its entirety.

BACKGROUND

The present disclosure relates generally to facilitating machine learning (ML) algorithm contribution in use cases with prohibitive data, and more particularly, to systems and methods for building reliable models for identifying valid tag reads captured by a tag reader device.

In supervised learning contexts, training data may be employed to build a ML model. The training data may be gathered from activity in a real world environment, and include a dataset of training examples with associated labels. For instance, when training a ML model in an electronic article surveillance tag (hereinafter "tag") monitoring environment, the training data may include triangulated tag reads captured by tag reader devices. Further, in some instances, the training data may be noisy and heavily biased with false positives. For example, the amount of spurious tag reads may significantly outnumber the amount of valid tag reads within the training data. As a result, it may be difficult to accurately and efficiently build useful ML models based on the training data in the tag monitoring environment.

Due to the challenges of acquiring sufficient training data and determining a set of features that could be used to build a ML model from the training data, many systems implement a rule-based approach as an alternative to using ML. Rule-based systems carry a variety of disadvantages. For example, rule-based systems fail to adapt to varying conditions or learn over time. In addition, managing a rule-based system may become burdensome and complex as the number of rules increase. Moreover, the probability of regression becomes greater with each modification or update to the rules.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides systems, apparatuses, and methods for building a ML model in a use case with prohibitive training data and employing the ML model within the use case.

In an aspect, a method for building a ML model in a use case with prohibitive training data, comprises determining training information including a plurality of stray training reads and a plurality of valid training reads, determining modified training information based at least in part on modifying the plurality of valid training reads, generating a model for distinguishing a valid read from a stray read based on the modified training information and an evolutionary algorithm, detecting, by a monitoring device, a plurality of tag reads in response to a plurality of interactions between a tag and the monitoring device, and determining, by the monitoring device, a plurality of valid tag reads based on the model and plurality of tag reads.

In some implementations, the monitoring device is a tag reader system in an electronic article surveillance system, and the method further comprises determining that the plurality of valid tag reads corresponds to unauthorized movement of the tag outside of a geographic area (e.g., theft of the article attached to the tag), and triggering an alarm notification based at least in part on the determining. In addition, the monitoring device may comprise a first pedestal including a first plurality of antennae and a second pedestal including a second plurality of antennae, and detecting the plurality of tag reads comprises synchronizing the first plurality of antennae of the first pedestal and the second plurality of antennae of the second pedestal to create a field and detecting a first tag read of the plurality of tag reads within the field.

In some implementations, the monitoring device is a tag scanner in an inventory management system, and the method further comprises determining that the plurality of valid tag reads correspond to a relocation of the tag to a geographic area, and triggering a location notification identifying the geographic area. Further, in some implementations, the method further comprises updating inventory information to indicate an article associated with the tag is located at a location of the monitoring device based on the location notification.

In some implementations, the evolutionary algorithm is a genetic algorithm, and generating the model comprises determining a first plurality of models for distinguishing a valid tag read from a stray read, determining fitness information indicating an efficacy of the first plurality of models, determining a second plurality of models based upon the fitness information and a threshold, determining a third plurality of models by mating the second plurality of models and applying mutations to offspring of the mating, and selecting the model from the third plurality of models. Further, in some implementations, the third plurality of models may be used by the tag monitoring system in an ensemble approach.

In an aspect, a system for building a ML model in a use case with prohibitive training data, comprises a management device comprising: a memory storing instructions thereon, and at least one processor coupled to the memory and configured by the instructions to identify training information including a plurality of stray training reads and a plurality of valid training reads, determine modified training information based at least in part on modifying the plurality of valid training reads, and generate a model for distinguishing a valid read from a stray read based on the modified training information and an evolutionary algorithm, the model to be used identify a plurality of valid tag reads captured at a monitoring device.

The present disclosure includes a system having devices, components, and modules corresponding to the steps of the described methods, and a computer-readable medium having instructions executable by a processor to perform the described methods.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Implementations of the present disclosure provide methods, apparatuses, and systems that allow for building a ML model in a use case with prohibitive training data and employing the ML model within the use case. As used herein, in some implementations, "prohibitive data" may refer to unfavorable data (e.g., unbalanced classes in the training data, insufficient sample complexity/size, etc.) that may present difficulties when endeavoring to train an accurate ML model. These systems, methods, and apparatuses will be described in the following detailed description and illustrated in the accompanying drawings by various modules, blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In some implementations, one problem solved by the present solution is one of accurately and efficiently generating a ML model despite unfavorable training data with which to train the ML model. For example, this present disclosure describes systems and methods to generate and employ one or more ML models even when conditions such as false positives and heavy bias are found in the training data.

In one example, the present disclosure includes a system and method for generating a ML model in a context with prohibitive training data and employing the ML model to enable the classification of tag reads as valid tag reads or stray tag reads in a tag monitoring system. The system and method utilize an evolutionary algorithm to mitigate an imbalance in training data when building a ML model, and employ the ML model to aid the system in detecting unauthorized movement of an article or relocation of an article with an inventory management system.

Implementations of the present disclosure may be useful for system designers and system operators endeavoring to employ ML despite prohibitive training data. For example, operators of electronic surveillance systems ("EAS") have faced many difficulties employing ML in tag monitoring solutions due to imbalanced training data. Existing solutions to this problem are cumbersome and inefficient, and require operators to employ rule-based systems that struggle to scale. The present solution provides improved accuracy and efficiency to such scenarios by generating performant ML models despite prohibitive training data.

Figure 1:
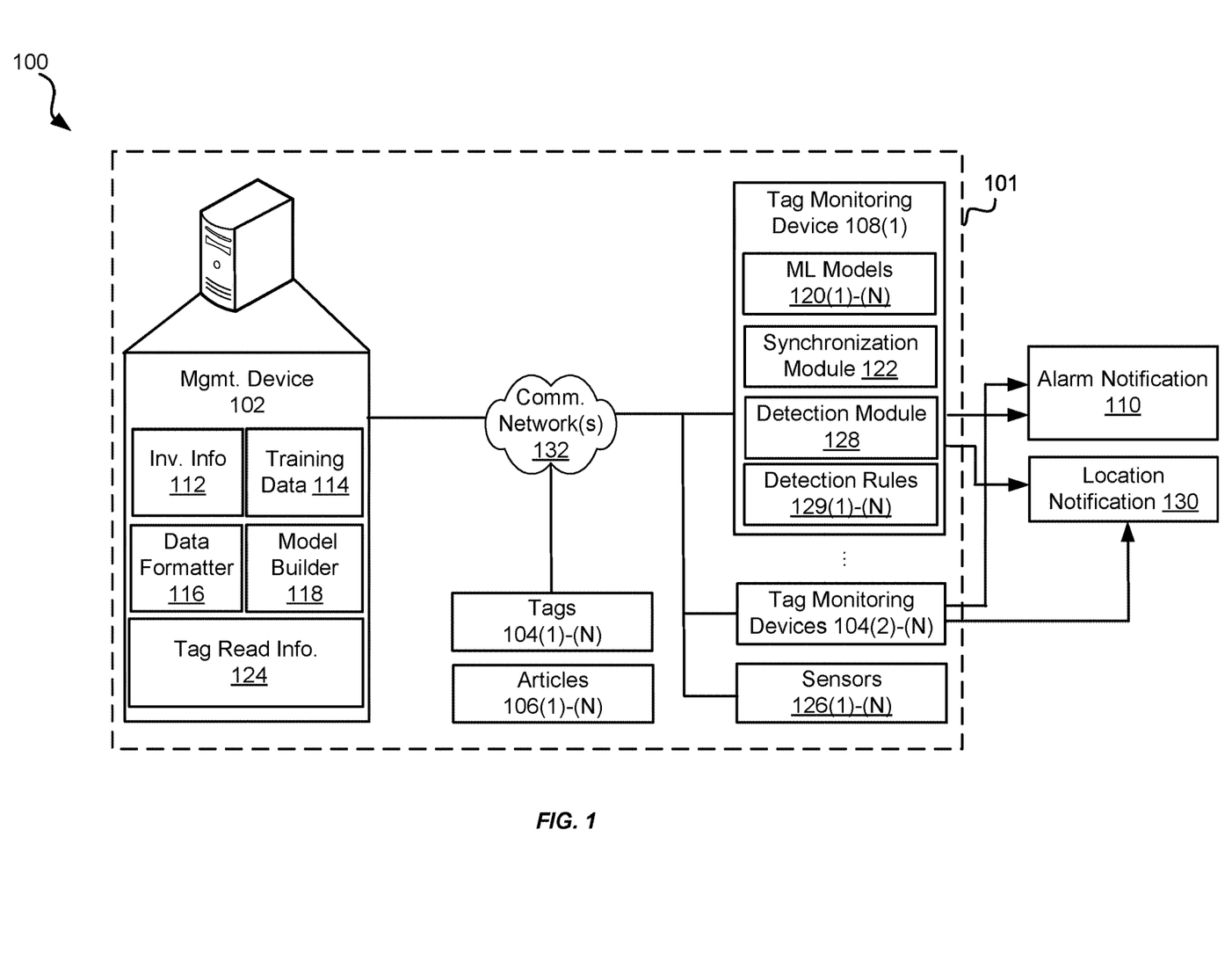
FIG. 1 is a schematic diagram of a system for facilitating ML algorithm contribution in use cases with prohibitive data, according to some implementations.

Referring to FIG. 1, in one non-limiting aspect, a system 100 is configured to generate a ML model for identifying valid tag reads by a tag reader device. For example, system 100 is configured to generate one or more ML models for classifying a tag read as a valid tag read or a stray tag read by applying an evolutionary algorithm to an imbalanced training dataset. Further, the system 100 may employ the one or more ML models in an EAS or an inventory management system located within a controlled area 101.

As illustrated in FIG. 1, the system may include a management device 102 to manage devices and data within the system 100, a plurality of tags 104(1)-(N) attached to a plurality of articles 106(1)-(N), and one or more tag monitoring devices 108(1)-(N) configured to detect the presence of the plurality of tags 104(1)-(N).

In some implementations, the plurality of tags 104(1)-(N) include radio frequency identification ("RFID") components. Further, the RIFD components may produce signals with one or more attributes detectable by the tag monitoring device 108(1)-(N). For instance, the RFID components may passively produce a resonant signal in response to an interrogation signal received from the tag monitoring devices 108(1)-(N). Further, the resonant signal may have a particular frequency that falls within an operating frequency range of the tag monitoring device 108.

In some implementations, the system 100 is an EAS, and the tag monitoring devices 108(1)-(2) include a tag reader system that establishes a surveillance zone in which the presence of the plurality of tags 104(1)-(N) can be detected. The surveillance zone may be established at an access point for the controlled area 101 (e.g., adjacent to a retail store entrance and/or exit). If a tag 104(1) is active and its corresponding article 106(1) enters the surveillance zone, an alarm notification 110 may be triggered to indicate possible unauthorized removal from the controlled area 101.

Additionally, or alternatively, the system 100 may be an inventory management system that tracks the location of the plurality of articles 106(1)-(N) within one or more geographic areas (e.g., the controlled area 101). In some implementations, the tag monitoring device 108 may be a handheld tag scanner that detects the presence of the plurality of tags 104(1)-(N), and updates inventory information 112 indicating the location of the plurality of articles 106(1)-(N) within the one or more geographic areas.

The system 100 may include training data 114 for training a ML model to classify valid tag reads and a data formatter 116 for formatting the training data 114 (e.g., normalizing the training data 114, encoding the training data 114, etc.). During a setup phase, the training data 114 may be generated by capturing interactions between a tag monitoring device (e.g., the tag monitoring device 108) and one or more tags (e.g., the plurality of tags 104). In some implementations, the interactions may be simulated in a testing environment or captured after initial installation of the tag monitoring devices 108(1)-(N) in a real-world environment.

The training data 114 may include a plurality of valid tag reads and a plurality of stray tag reads. Further, individual tag reads may include for example but not limited hereto, one or any combination of an identifier of the tag, a date and time of the interaction, an identifier of the tag monitoring device, an identifier of the corresponding article, antenna information, gate information, a port identifier, a beam identifier, a session identifier, a target identifier, a field identifier, a zone identifier, direction (e.g., ingoing or outgoing), an activity type (e.g., walking, running), a channel number, transmission power, frequency, or a received signal strength indicator ("RSSI") value. As described herein, due to the nature of tag detection, the training data 114 may be prohibitive. For example, the training data 114 may be extremely noisy and heavily biased with false positives due to reflections, blockages, and other conditions that may cause stray tag readings at the tag monitoring devices 108(1)-(N). In some instances, the training data 114 may be severely imbalanced, i.e., there may be significantly more stray tag reads than valid tag reads. In response, the data formatter 116 may generate additional valid tag reads by generating copies of the valid tag reads, and applying slight modifications or mutations to the copies of the valid tag reads.

As illustrated in FIG. 1, the system 100 may include a model builder 118 for generating ML models 120(1)-(N) for identifying valid tag reads. The model builder 118 may determine an algorithm type, features, parameters (e.g., weights, layer shape, layer count, etc.), and hyperparameters for an ML model 120. For example, the model builder 118 may employ deep learning techniques to extract higher level features from the training data 114.

In some implementations, in order to generate the ML models 120(1)-(N), the model builder 118 may define a loss function that measures the inaccuracy of predictions made by the ML models 120(1)-(N), and find the parameters that minimize error in the predictions made by the ML models 120(1)-(N). As a result of the unbalanced nature of the training data 114, minimizing error in predictions made by the ML models 120(1)-(N) with respect to the training data 114 may be a non-convex optimization problem. As referred to herein, in some implementations, a non-convex optimization problem is a problem where the objective or any of the constraints are non-convex. Such problems may have multiple feasible regions and multiple locally optimal points within each region. Further, the model builder 118 may employ a gradient-based technique to find the minimum of a loss function of an ML model 120. For instance, the model builder 118 may employ a gradient descent algorithm configured to iteratively work towards a minimum of a loss function of an ML model 120. In some implementations, the gradient descent algorithm may perform training iterations wherein during each training iteration the parameters of a ML model 120 may be increased by a step, decreased by a step, or unchanged.

In some implementations, the model builder 118 may employ an evolutionary algorithm to build the ML models 120(1)-(N). For example, the model builder 118 may employ a genetic algorithm that iteratively selects the fittest solutions as a population, mates the fittest solutions to generate offspring solutions, mutates the offspring solutions, and determines the fitness of the mutated offspring solutions. Over successive iterations (i.e., generations) the population may evolve towards an optimal solution.

Specifically, the genetic algorithm may build a population of solutions called individuals. Each individual may be represented as a chromosome which includes a set of parameters (e.g., features/variables, etc.) that define the individual. In other words, an individual is characterized by a set of parameters known as genes, and the genes may be combined into a string to form a chromosome representing an individual.

In some implementations, a chromosome may be represented by a plurality of gene values each located at a gene location corresponding to a particular feature of the model. Further, the model builder 118 may employ a fitness function to determine a fitness value of each individual. The fitness value may represent the quality or efficacy of the individual. As such, the higher the fitness value the higher the quality the individual.

In addition, the model builder 118 may select a number of individuals from the population as members of a mating pool. In some instances, the model builder 118 may select a predetermined amount or percentage of individuals, or one or more individuals having a fitness value above a predetermined threshold. Next, the model builder 118 may mate the individuals within the mating pool. In some implementations, mating may include performing a crossover function between two parent individuals to generate two offspring having gene values from both of the parent individuals. Further, the gene values passed to the offspring may be randomly selected. In some implementations, the model builder 118 may perform a single point crossover where the model builder 118 selects a random gene location in the chromosomes of the parents and exchanges gene values before and after the gene location from the parent individuals. Additionally, the model builder 118 may perform a mutation function on the two offspring. The mutation function may randomly modify one or more gene values within the chromosomes of the offspring. If the population has converged (i.e., fails to produce offspring which are significantly different from the previous generation), the genetic algorithm may terminate and the mutated offspring may be employed as the ML models 120(1)-(N). Otherwise, the model builder 118 may replace the individuals within the population with the offspring and repeat the steps of the genetic algorithm.

As illustrated in FIG. 1, the system 100 may further include a synchronization module 122 configured coordinate the creation of sessions, fields, and zones by one or more monitoring devices 108(1)-(N). In some implementations, the synchronization module 122 may facilitate tag readers of the one or more monitoring devices 108(1)-(N) cycling through upper and lower antennae, inside and outside beams on each antennae, high power session reads for "FAR" detection of tags, and lower power session reads for "NEAR" detection of tags. For example, the monitoring devices 108(1)-(2) may be installed by a door. In addition, the tag monitoring device 108(1) may include a first pedestal including a first plurality of antennae, and the tag monitoring device 108(2) may include a second pedestal including a second plurality of antennae. Further, the synchronization module 122 may assist the first pedestal and second pedestal in the creation of four overlapping fields by adjusting the power at which the various antennae read. In some instances, when a tag 104(1) is read by the monitoring devices 108(1)-(N), the monitoring devices 108(1)-(N) may store the tag read as a tag read entry in the tag read information 124. Additionally, in some implementations, an individual tag read entry may identify the zone in which the tag 104(1) was located during the read.

As illustrated in FIG. 1, the system 100 may include one or more sensors 126(1)-(N) (e.g., a people counter, motion detector, etc.) for indicating whether a tag read corresponds to a person entering a controlled area 101 or a person departing the controlled area 101. Further, as illustrated in FIG. 1, the system 100 may include a detection module 128 configured to detect unauthorized movement of the articles 106(1)-(N) thru a surveillance zone. The detection module 128 may employ at least one of the ML models 120(1)-(N), the sensors 126(1)-(N), tag read information 124, and one or more detection rules 129(1)-(N) to detect unauthorized movement of the plurality of articles 106(1)-(N). For example, the detection module 128 may employ the ML models 120(1)-(N) to identify valid reads within the tag read information 124, and the sensors 126(1)-(N) and the detection rules 129(1)-(N) to determine whether to trigger a notification (e.g., the alarm notification 110) in view of the identified valid reads. Further, in some implementations, the detection module 128 may employ two or more of the ML models 120(1)-(N) in an ensemble approach.

For example, a person may carry the item 106(1) with the tag 104(1) attached thereto, and walk through a surveillance zone created by the monitoring devices 108(1)-(2). As the person walks through the surveillance zone, a collection of tag reads may be created based upon the interactions between the tag 104(1) and the monitoring devices 108(1)-(2), and stored within the tag read information 124. Further, the detection module 128 may employ one or more of the ML models 120(1)-(N) to determine which tag reads within the tag read information 124 are valid tag reads. In addition, the detection module 128 may extract the field of each valid tag read, and generate a time-ordered pattern including the fields. If the sensors 126(1)-(N) indicate that the person is traveling from inside of the controlled area 101 to outside of the controlled and the detection rules 129(1)-(N) indicate that the pattern is consistent with unauthorized movement through the surveillance zone, the detection module 128 may trigger the alarm notification 110. In some implementations, the system 100 may update the ML models 120(1)-(N) based at least in part on the performance of the detection module 128. For example, the model builder 118 may retrain a ML model 120 based upon the accuracy of the detection module 128 in real-world usage.

In some implementations, the system 100 is an inventory management system. Further, the detection module 128 may be configured to detect the relocation of the tag 104(1) and the article 106(1) to a geographic area within a controlled area 101. For example, an operator of the inventory management system may employ the tag monitoring device 108(1) to read the tag 104(1) on the article 106(1). If the detection module 128 determines that the read is a valid tag read, the detection module 128 may trigger a location notification 130 identifying the current location of the tag monitoring device 108(1). Further, in some implementations, the management device 102 or the tag monitoring device 108(1) may update inventory information corresponding to the article 106(1) to indicate that the article 106(1) is located at a location of the monitoring device based on the location notification 130.

In some examples, the management device 102 may include the inventory information 112, the training data 114, the data formatter 116, the model builder 118, the ML models 120(1)-(N), the synchronization module 122, the tag read information 124, or the detection module 128. Additionally, or alternatively, the monitoring devices 108(1)-(N) may include the inventory information 112, the training data 114, the data formatter 116, the model builder 118, the ML models 120(1)-(N), the synchronization module 122, the tag read information 124, or the detection module 128.

As illustrated in FIG. 1, in some implementations, the system 100 may include a communication network 132. Further, the management device 102, the monitoring devices 104(1)-(N), the tags 106(1)-(N), and the sensors 126(1)-(N) may communicate via the communication network 132. For example, the synchronization module 122 may synchronize the monitoring devices 104(1)-(N) via the communication network 132, the management device 102 may send the ML models 120(1)-(N) to the monitoring devices 104(1)-(N) via the communication network 132, and the monitoring devices 104(1)-(N) may send the location notification 130 to the management device 102 via the communication network 132. In some implementations, the communication network 132 may include any or all of a wired and/or wireless private network, personal area network, local area network, wide area network, or the Internet.

Figure 2:
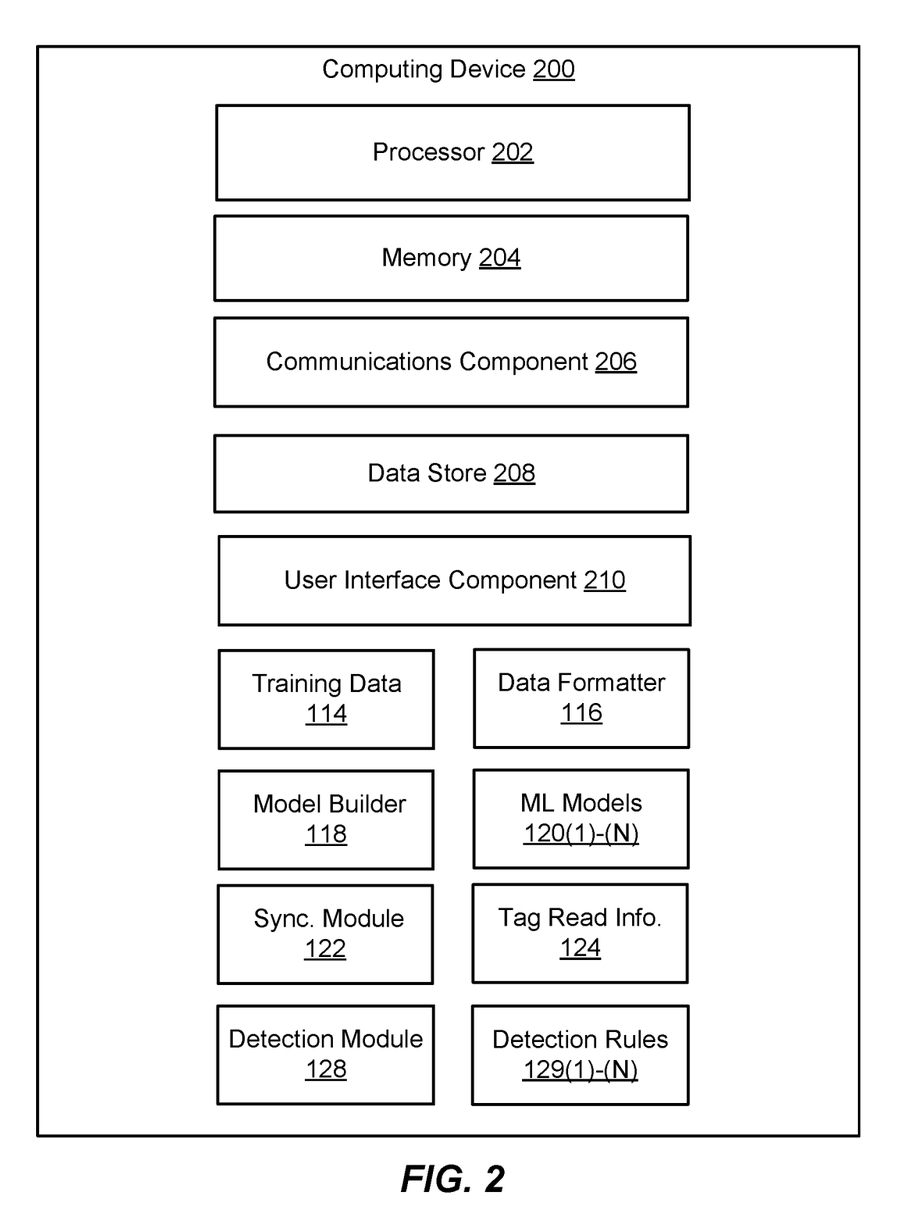
FIG. 2 is block diagram of an example of a computer device configured to facilitate ML algorithm contribution in use cases with prohibitive data, according to some implementations.

Referring to FIG. 2, a computing device 200 may implement all or a portion of the functionality described herein. The computing device 200 may be or may include or may be configured to implement the functionality of at least a portion of the system 100, or any component therein. For example, the computing device 200 may be or may include or may be configured to implement the functionality of the management device 102, the tags 104(1)-(N), the monitoring devices 108(1)-(N), or the sensors 126(1)-(N). The computing device 200 includes a processor 202 which may be configured to execute or implement software, hardware, and/or firmware modules that perform any functionality described herein. For example, the processor 202 may be configured to execute or implement software, hardware, and/or firmware modules that perform any functionality described herein with reference to the model builder 118 for generating the ML models 120(1)-(N), the detection module 128 for detecting specific types of movement of the plurality of articles 106(1)-(N) using the ML models 120(1)-(N) and triggering the alarm notification 110 or the location notification 130, or any other component/system/device described herein.

The processor 202 may be a micro-controller, an application-specific integrated circuit (ASIC), a digital signal processor (DSP), or a field-programmable gate array (FPGA), and/or may include a single or multiple set of processors or multi-core processors. Moreover, the processor 202 may be implemented as an integrated processing system and/or a distributed processing system. The computing device 200 may further include a memory 204, such as for storing local versions of applications being executed by the processor 202, related instructions, parameters, etc. The memory 204 may include a type of memory usable by a computer, such as random access memory (RAM), read only memory (ROM), tapes, magnetic discs, optical discs, volatile memory, non-volatile memory, and any combination thereof. Additionally, the processor 202 and the memory 204 may include and execute an operating system executing on the processor 202, one or more applications, display drivers, etc., and/or other components of the computing device 200.

Further, the computing device 200 may include a communications component 206 that provides for establishing and maintaining communications with one or more other devices, parties, entities, etc. utilizing hardware, software, and services. The communications component 206 may carry communications between components on the computing device 200, as well as between the computing device 200 and external devices, such as devices located across a communications network and/or devices serially or locally connected to the computing device 200. In an aspect, for example, the communications component 206 may include one or more buses, and may further include transmit chain components and receive chain components associated with a wireless or wired transmitter and receiver, respectively, operable for interfacing with external devices.

Additionally, the computing device 200 may include a data store 208, which can be any suitable combination of hardware and/or software, that provides for mass storage of information, databases, and programs. For example, the data store 208 may be or may include a data repository for applications and/or related parameters not currently being executed by processor 202. In addition, the data store 208 may be a data repository for an operating system, application, display driver, etc., executing on the processor 202, and/or one or more other components of the computing device 200.

The computing device 200 may also include a user interface component 210 operable to receive inputs from a user of the computing device 200 and further operable to generate outputs for presentation to the user (e.g., via a display interface to a display device). The user interface component 210 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 210 may include one or more output devices, including but not limited to a display interface, a speaker, a haptic feedback mechanism, a printer, any other mechanism capable of presenting an output to a user, or any combination thereof.

Figure 3:
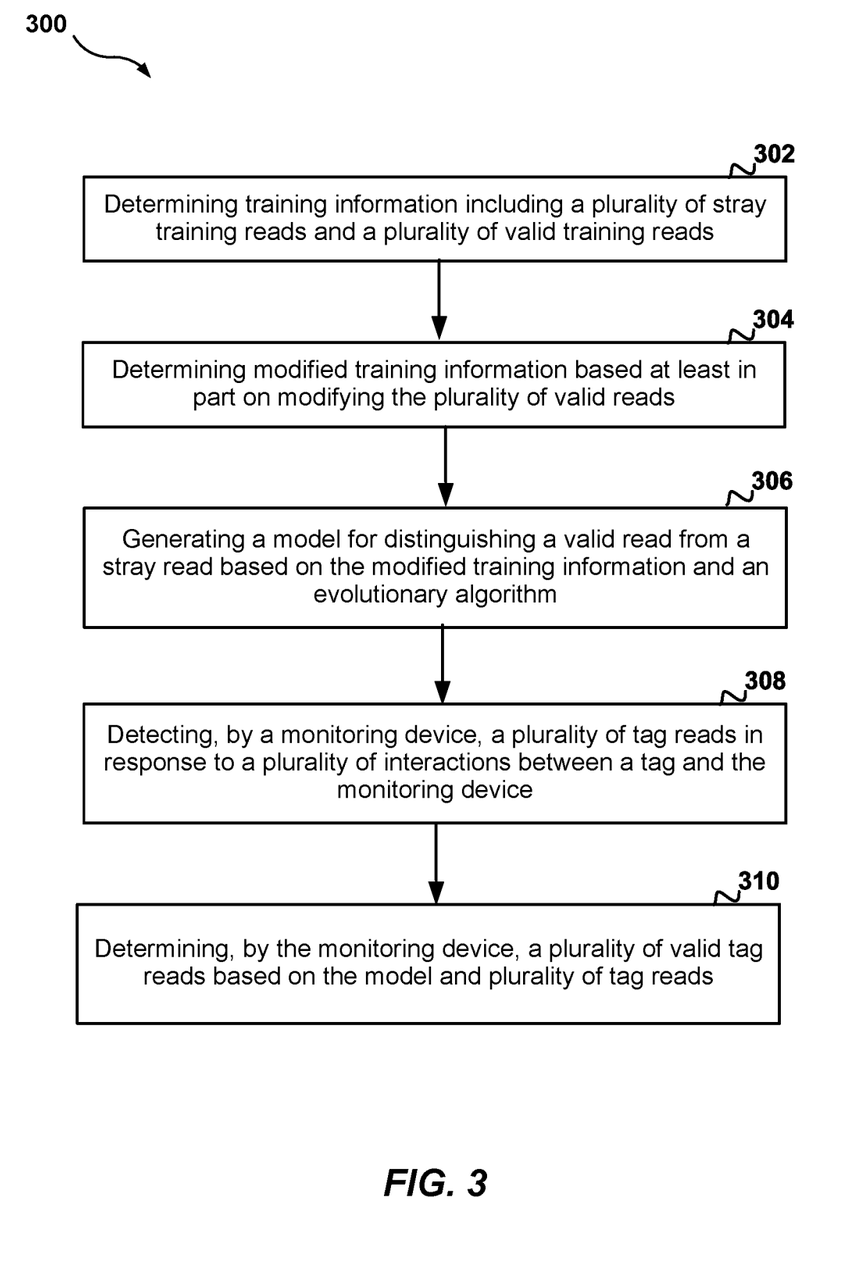
FIG. 3 is a flow diagram of an example of a method of facilitating ML algorithm contribution in use cases with prohibitive data, according to some implementations.

Referring to FIG. 3, in operation, the computing device 200 may perform an example method 300 for facilitating ML algorithm contribution in use cases with prohibitive data. The method 300 may be performed by one or more components of the computing device 200 or any device/component described herein according to the techniques described with reference to FIG. 1.

At block 302, the method 300 includes determining training information including a plurality of stray training reads and a plurality of valid training reads. For example, the training data 114 may be generated by capturing interactions between at least one of the tag monitoring devices 108 and at least one of the tags 104(1)-(N). In some aspects, the interactions may be simulated in a testing environment or captured after installation of the tag monitoring devices 108 in a real-world environment (e.g., the controlled area). As described in detail herein, the training data 114 may include a plurality of stray training reads and a plurality of valid training reads. Further, the training data 114 may be provided to the management device 102. Accordingly, the management device 102 or the processor 202 may provide means for determining training information including a plurality of stray training reads and a plurality of valid training reads.

At block 304, the method 300 includes determining modified training information based at least in part on modifying the plurality of valid reads. For example, the data formatter 116 may generate additional valid tag reads by generating copies of the valid tag reads, and applying modification or mutations to the generated copies within the training data 114. Accordingly, the management device 102 or the processor 202 executing the data formatter 116 may provide means for determining modified training information based at least in part on modifying the plurality of valid reads.

At block 306, the method 300 includes generating a model for distinguishing a valid read from a stray read based on the modified training information and an evolutionary algorithm. For example, the model builder 118 may generate the ML models 120(1)-(N) for identifying the valid tag reads based in on the training data 114 including the copied and modified valid tag reads. Further, the model builder 118 may employ an evolutionary algorithm to build the ML models 120(1)-(N). For example, the model builder 118 may employ a genetic algorithm that iteratively selects the fittest solutions as a population, mates the fittest solutions to generate offspring solutions, mutates the offspring solutions, and determines the fitness of the mutated offspring solutions. As described herein, over successive generations the population may evolve towards an optimal solution. Accordingly, the management device 102 or the processor 202 executing the model builder 118 may provide means for generating a model for distinguishing a valid read from a stray read based on the modified training information and an evolutionary algorithm.

At block 308, the method 300 includes detecting, by a monitoring device, a plurality of tag reads in response to a plurality of interactions between a tag and the monitoring device. For example, the synchronization module 122 may help establish a surveillance zone by coordinating the creation of sessions, fields, and zones by a tag reader system of the monitoring devices 108(1)-(N). Further, patrons within the controlled area 101 may carry the items 106 with the tags 104 attached thereto, and walk through the surveillance zone created by the monitoring devices 108(1)-(2). As the patrons walk through the surveillance zone, a collection of tag reads may be created based upon the interactions between the tags 104 and the monitoring devices 108(1)-(2), and stored as the tag read information 124. As another example, in some aspects, the tag monitoring device 108(1) may be a handheld tag scanner, and an operator of the inventory management system may employ the tag monitoring device 108(1) to read the tag 104(1) on the article 106(1) that detects the presence of the tags 104(1)-(N) during an inventory management process to generate the tag read information 124.

Accordingly, in some aspects, the tag monitoring device 108 or the processor 202 may provide means for detecting, by a monitoring device, a plurality of tag reads in response to a plurality of interactions between a tag and the monitoring device. For example, the tag monitoring device 108 or the processor 202 executing the synchronization module 122 provide means for detecting, by a monitoring device, a plurality of tag reads in response to a plurality of interactions between a tag and the monitoring device.

At block 310, determining, by the monitoring device, a plurality of valid tag reads based on the model and third plurality of tag reads. For example, the detection module 128 may employ one or more of the ML models 120(1)-(N) to determine which tag reads within the tag read information 124 are valid tag reads. In addition, the detection module 128 may extract the field of each valid tag read, and generate a time-ordered pattern including the fields. If the sensors 126(1)-(N) indicate that the person is traveling from inside of the controlled area 101 to outside of the controlled and the detection rules 129(1)-(N) indicate that the pattern is consistent with unauthorized movement through the surveillance zone, the detection module 128 may trigger the alarm notification 110.

As another example, the detection module 128 may determine if a tag scanner read captured by the tag monitoring device 108(1) is a valid tag read. If the detection module 128 determines that the tag scanner read is a valid tag read, the detection module 128 may trigger a location notification 130 identifying the current location of the tag monitoring device 108(1). Further, in some implementations, the management device 102 or the tag monitoring device 108(1) may update inventory information corresponding to the article 106(1) to indicate that the article 106(1) is located at a location of the monitoring device based on the location notification 130.

Accordingly, the tag monitoring device 108 or the processor 202 executing the detection module 128 provide means for determining, by the monitoring device, a plurality of valid tag reads based on the model and third plurality of tag reads.

In an alternative or additional aspect, the evolutionary algorithm may be a genetic algorithm, and to generate the model may comprises, the method 300 comprises determining a first plurality of models for distinguishing the valid tag read from the stray read, determining fitness information indicating an efficacy of the first plurality of models, determining a second plurality of models based upon the fitness information and a threshold, determining a third plurality of models by mating amongst the second plurality of models and applying mutations to offspring of the mating, and selecting the model from the third plurality of models.

In an alternative or additional aspect, the monitoring device comprises a first pedestal including a first plurality of antennae and a second pedestal including a second plurality of antennae, and to detecting the plurality of tag reads, the method 300 comprises synchronizing the first plurality of antennae of the first pedestal and the second plurality of antennae of the second pedestal to create a field, and detecting a first tag read of the plurality of tag reads within the field.

In an alternative or additional aspect, the monitoring device is a tag reader system in an electronic article surveillance system, the method 300 further comprises determining that the plurality of valid tag reads corresponds to unauthorized movement of the tag outside of a geographic area, and triggering an alarm notification based at least in part on the determining.

In an alternative or additional aspect, the monitoring device is a tag scanner in an inventory management system, the method 300 further comprises determining that the plurality of valid tag reads correspond to a relocation of the tag to a geographic area, and triggering a location notification identifying the geographic area.

In an alternative or additional aspect, the method 300 further comprises updating inventory information to indicate an article associated with the tag is located at a location of the monitoring device based on the location notification.

In some implementations, the method 300 may further include updating inventory information corresponding to the based upon a location of the monitoring device.

In some implementations, the method 300 may further include updating inventory information to indicate an article associated with the tag is located at a location of the monitoring device.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:
1. A method, comprising:
   determining training information including a plurality of stray training reads and a plurality of valid training reads;

determining modified training information based at least in part on modifying the plurality of valid training reads;

generating a model for distinguishing a valid read from a stray read based on the modified training information and an evolutionary algorithm;

detecting, by a monitoring device, a plurality of tag reads in response to a plurality of interactions between a tag and the monitoring device; and determining, by the monitoring device, a plurality of valid tag reads based on the model and plurality of tag reads.

2. The method of claim 1, wherein the evolutionary algorithm is a genetic algorithm, and generating the model comprises:

determining a first plurality of models for distinguishing the valid read from the stray read;

determining fitness information indicating an efficacy of the first plurality of models;

determining a second plurality of models based upon the fitness information and a threshold;

determining a third plurality of models by mating amongst the second plurality of models and applying mutations to offspring of the mating; and selecting the model from the third plurality of models.

3. The method of claim 1, wherein the monitoring device comprises a first pedestal including a first plurality of antennae and a second pedestal including a second plurality of antennae, and detecting the plurality of tag reads, comprises:

synchronizing the first plurality of antennae of the first pedestal and the second plurality of antennae of the second pedestal to create a field; and detecting a first tag read of the plurality of tag reads within the field.

4. The method of claim 1, wherein the monitoring device is a tag reader system in an electronic article surveillance system, and further comprising:

determining that the plurality of valid tag reads corresponds to unauthorized movement of the tag outside of a geographic area; and triggering an alarm notification based at least in part on the unauthorized movement.

5. The method of claim 1, wherein the monitoring device is a tag scanner in an inventory management system, and further comprising:

determining that the plurality of valid tag reads correspond to a relocation of the tag to a geographic area; and triggering a location notification identifying the geographic area.

6. The method of claim 5, further comprising updating inventory information to indicate an article associated with the tag is located at a location of the monitoring device based on the location notification.

7. The method of claim 1, further comprising updating the model based on a measured accuracy of the monitoring device.

8. A system comprising:
a management device comprising:
a memory storing instructions thereon; and
at least one processor coupled to the memory and configured by the instructions to:
identify training information including a plurality of stray training reads and a plurality of valid training reads;

determine modified training information based at least in part on modifying the plurality of valid training reads; and generate a model for distinguishing a valid read from a stray read based on the modified training information and an evolutionary algorithm, the model to be employed to identify a plurality of valid tag reads captured at a monitoring device.

9. The system of claim 8, wherein the evolutionary algorithm is a genetic algorithm.

10. The system of claim 9, wherein to generate the model, the at least one processor is configured by the instructions to:

determine a first plurality of models for distinguishing the valid read from the stray read;

determine fitness information indicating an efficacy of the first plurality of models;

determine a second plurality of models based upon the fitness information and a threshold;

determine a third plurality of models by mating amongst the second plurality of models and applying mutations to offspring of the mating; and select the model from the third plurality of models.

11. The system of claim 8, further comprising the monitoring device including a first pedestal including a first plurality of antennae and a second pedestal including a second plurality of antennae, and wherein the monitoring device is configured to detect, based on interactions with one or more tags, a plurality of tag reads including the plurality of valid tag reads.

12. The system of claim 8, further comprising the monitoring device, and wherein the monitoring device is configured to determine that the plurality of valid tag reads corresponds to unauthorized movement of a tag outside of a geographic area, and triggering an alarm notification based at least in part on the unauthorized movement.

13. The system of claim 8, further comprising the monitoring device, and wherein the monitoring device is configured to determine that the plurality of valid tag reads correspond to a relocation of a tag to a geographic area, and trigger a location notification identifying the geographic area.

14. A non-transitory computer-readable device having instructions thereon that, when executed by at least one computing device, causes the at least one computing device to perform operations comprising:

determining training information including a plurality of stray training reads and a plurality of valid training reads;

determining modified training information based at least in part on modifying the plurality of valid training reads;

generating a model for distinguishing a valid read from a stray read based on the modified training information and an evolutionary algorithm;

detecting, by a monitoring device, a plurality of tag reads in response to a plurality of interactions between a tag and the monitoring device; and determining, by the monitoring device, a plurality of valid tag reads based on the model and plurality of tag reads.

15. The non-transitory computer-readable device of claim 14, wherein the evolutionary algorithm is a genetic algorithm, and generating the model comprises:

determining a first plurality of models for distinguishing the valid tag read from the stray read;

determining fitness information indicating an efficacy of the first plurality of models;

determining a second plurality of models based upon the fitness information and a threshold;

determining a third plurality of models by mating amongst the second plurality of models and applying mutations to offspring of the mating; and selecting the model from the third plurality of models.

16. The non-transitory computer-readable device of claim 15, wherein selecting the model from the third plurality of models comprises determining that the third plurality of models have converged.

17. The non-transitory computer-readable device of claim 14, wherein the monitoring device comprises a first pedestal including a first plurality of antennae and a second pedestal including a second plurality of antennae, and detecting the plurality of tag reads, comprises:

synchronizing the first plurality of antennae of the first pedestal and the second plurality of antennae of the second pedestal to create a field; and detecting a first tag read of the plurality of tag reads within the field.

18. The non-transitory computer-readable device of claim 14, wherein the monitoring device is a tag reader system in an electronic article surveillance system, and the operations further comprising:

determining that the plurality of valid tag reads corresponds to unauthorized movement of the tag outside of a geographic area; and triggering an alarm notification based at least in part on the unauthorized movement.

19. The non-transitory computer-readable device of claim 14, wherein the operations further comprise:

determining that the plurality of valid tag reads correspond to a relocation of the tag to a geographic area; and triggering a location notification identifying the geographic area.

20. The non-transitory computer-readable device of claim 19, wherein the operations further comprise updating inventory information to indicate an article associated with the tag is located at a location of the monitoring device based on the location notification.

* * * * *